Feb. 3, 1925.

J. PUTTER 1,525,046

BREAD PAN COVER

Filed June 19, 1924

Inventor
J. Putter

By Clarence A. O'Brien
Attorney

Patented Feb. 3, 1925.

1,525,046

UNITED STATES PATENT OFFICE.

JACOB PUTTER, OF NORTH PLAINFIELD, NEW JERSEY.

BREAD-PAN COVER.

Application filed June 19, 1924. Serial No. 721,001.

*To all whom it may concern:*

Be it known that I, JACOB PUTTER, a citizen of the United States, residing at North Plainfield, in the county of Somerset and State of New Jersey, have invented certain new and useful Improvements in Bread-Pan Covers, of which the following is a specification.

This invention relates to detachable covers especially adapted to be used upon baking bread pans, and it consists in the novel features hereinafter described and claimed.

An object of the invention is to provide a cover of the character stated, with means which may be easily and conveniently operated for securing the cover in position upon the pan or for receiving the cover in order that it may be removed from the pan.

With this object in view, the cover comprises a body provided at its edges with flanges adapted to engage around the curled edges of the bread pan, the flange at one end of the cover being provided with a clip portion for engagement under the curl at one end edge of the bread pan, and the cover being provided at its opposite end with a clamp lever adapted to engage under the curled edge of the bread pan, whereby the cover may be drawn down tightly against the edges of the bread pan when it is applied.

Figure 1:
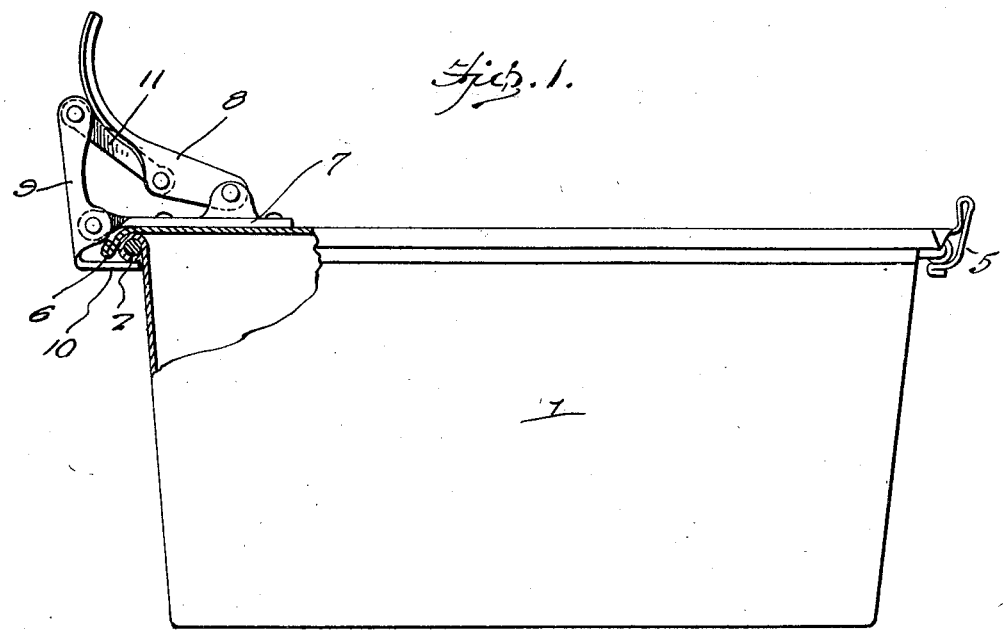
Figure 1 is a side elevation of a bread pan, with parts thereof shown in section, and illustrating the cover applied.
Figure 2:
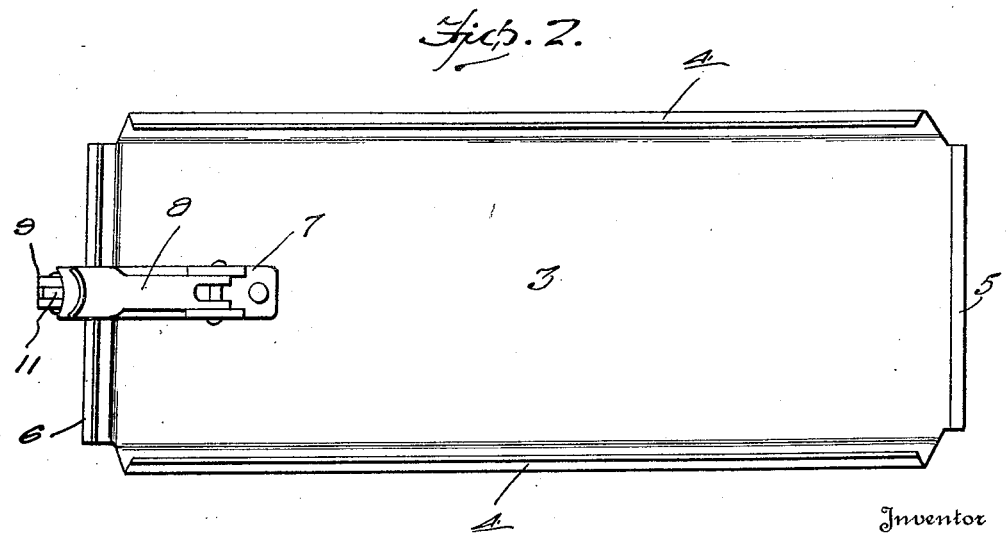
Figure 2 is a top plan view of the cover detached.

As illustrated in the accompanying drawing, the bread pan is shown at 1, and the said pan is provided around its edge with a wired or curled outstanding bead 2 of the usual form. The cover comprises a sheet 3 of metal provided at its longitudinal edges with flanges 4 adapted to engage around the curls 2 at the longitudinal side of the pan 1. At one end, the sheet 3 is continued into a resilient clip 5, which is in the form of a loop having a portion thereof standing above the upper surface of the body of the sheet 3, and the lower edge portion of the said strip being adapted to engage under one of the curled edges 2 of the pan 1. At its opposite end, the sheet 3 is provided with a flange 6 adapted to bear down upon the exterior surface of the curl 2 at the opposite end of the pan 1. A plate 7 is mounted upon the sheet 3 at the end thereof which is provided with the flange 6 and a lever 8 is pivoted upon the said plate. A clamp lever 9 is pivoted upon the end of the plate 7 and is provided with an angularly disposed end 10, adapted to engage under one of the curls 2 of the body of the pan 1. A link 11 is pivotally connected at one end with the intermediate portion of the lever 8, and pivotally connected at its other end with the upper end of the lever 9.

Therefore, it will be seen that when the cover is applied to the upper edge of the pan, and when the lever 8 is swung so that its free end portion overlaps the intermediate portion of the link 11, the end portion 10 of the clamp lever 9 will be projected under the curl 2, at the end of the pan 1, and the flange 6 will be held down tightly upon the upper surface of the said curl. When the free end portion of the lever 8 is swung back over the intermediate portion of the sheet 3, the link 11 draws the upper end of the clamp lever 9 toward the intermediate portion of the sheet 3 and consequently the angularly disposed end portion 10 of the clamp lever 9 is withdrawn from under the curl 2 of the body of the pan 1, and the cover 3 may be readily detached from the upper edges of the pan.

Having described the invention, what is claimed is:

A pan cover comprising a sheet having edge flanges, one of which is formed as a resilient clip, a plate mounted upon the sheet at the opposite edge portion thereof, a clamp lever pivoted upon the plate and having an angularly disposed end portion, a second lever pivoted upon the plate, and a link pivotally connected with the second mentioned lever and with the clamp lever.

In testimony whereof I affix my signature.

JACOB PUTTER.